US011530657B2

(12) United States Patent
Halbe et al.

(10) Patent No.: US 11,530,657 B2
(45) Date of Patent: Dec. 20, 2022

(54) COMPRESSOR SURGE CONTROL

(71) Applicant: Cummins Inc., Columbus, IN (US)

(72) Inventors: Mayura H. Halbe, Columbus, IN (US); Ming-Feng Hsieh, Nashville, IN (US)

(73) Assignee: Cummins Inc., Columbus, IN (US)

(*) Notice: Subject to any disclaimer, the term of this patent is extended or adjusted under 35 U.S.C. 154(b) by 92 days.

(21) Appl. No.: 17/117,432

(22) Filed: Dec. 10, 2020

(65) Prior Publication Data

US 2021/0095606 A1    Apr. 1, 2021

Related U.S. Application Data

(63) Continuation of application No. PCT/US2019/038682, filed on Jun. 24, 2019.

(Continued)

(51) Int. Cl.
| | | |
|---|---|---|
| F02D 41/00 | (2006.01) | |
| F02B 37/16 | (2006.01) | |
| F04D 27/02 | (2006.01) | |
| F02M 26/13 | (2016.01) | |
| F02B 37/18 | (2006.01) | |

(Continued)

(52) U.S. Cl.
CPC ........ *F02D 41/0007* (2013.01); *F02B 37/162* (2019.05); *F02B 37/186* (2013.01); *F02D 9/02* (2013.01); *F02M 26/13* (2016.02); *F02M 31/20* (2013.01); *F02M 35/1038* (2013.01); *F02M 35/10157* (2013.01); *F04D 27/0215* (2013.01); *F02B 2037/125* (2013.01); *F02D 2200/0406* (2013.01)

(58) Field of Classification Search
CPC .................. F02D 41/0007; F02D 9/02; F02D 2200/0406; F02D 41/0002; F02D 41/18; F02D 2041/1433; F02D 23/00; F02B 37/162; F02B 37/186; F02B 2037/125; F02B 23/00; F02B 37/16; F02M 26/13; F02M 31/20; F02M 35/10157; F02M 35/1038; F04D 27/0215
USPC ........................................................ 60/602
See application file for complete search history.

(56) References Cited

U.S. PATENT DOCUMENTS 5,709,526 A    1/1998    McLeister et al.
5,798,941 A    8/1998    McLeister
(Continued)

FOREIGN PATENT DOCUMENTS

CN    1894492    1/2007
WO    2015157496    10/2016

OTHER PUBLICATIONS

European Search Report, EP Appln. No. 19830697.9, 8 pgs., dated Mar. 10, 2022.

(Continued)

*Primary Examiner* — J. Todd Newton
(74) *Attorney, Agent, or Firm* — Taft Stettinius & Hollister LLP

(57) ABSTRACT

Systems, methods and apparatus are disclosed for providing or maintaining a target surge margin at the compressor during steady state engine operating conditions and to avoid compressor surge during transients by controlling a compressor recirculation valve position to a commanded position. The estimated surge margin can be determined in response to the measured pressure ratio across the compressor, an estimated compressor flow, and a compressor map for the compressor.

20 Claims, 2 Drawing Sheets

Related U.S. Application Data

(60) Provisional application No. 62/693,109, filed on Jul. 2, 2018.

(51) Int. Cl.
  *F02D 9/02* (2006.01)
  *F02M 31/20* (2006.01)
  *F02M 35/10* (2006.01)
  *F02B 37/12* (2006.01)

(56) References Cited

U.S. PATENT DOCUMENTS

| | | | |
|---|---|---|---|
| 6,406,268 B1* | 6/2002 | Paice | F04D 27/0284 |
| | | | 417/300 |
| 7,089,738 B1 | 8/2006 | Boewe et al. | |
| 7,398,773 B2 | 7/2008 | Geyer et al. | |
| 7,841,825 B2 | 11/2010 | Chen et al. | |
| 8,307,645 B2 | 11/2012 | Mischler et al. | |
| 8,516,815 B2 | 8/2013 | Shu et al. | |
| 9,127,684 B2 | 9/2015 | Galeotti | |
| 9,133,850 B2 | 9/2015 | Narayanan et al. | |
| 9,279,374 B2 | 3/2016 | Buckland et al. | |
| 9,657,660 B2 | 5/2017 | Hellstrom et al. | |
| 2012/0221223 A1 | 8/2012 | Schaffeld et al. | |
| 2012/0328410 A1 | 12/2012 | Narayanan et al. | |
| 2014/0260241 A1* | 9/2014 | Jankovic | F02B 37/16 |
| | | | 60/273 |
| 2015/0047342 A1 | 2/2015 | McConville et al. | |
| 2015/0047605 A1 | 2/2015 | Buckland et al. | |
| 2015/0300281 A1 | 10/2015 | Sivasubramanian et al. | |
| 2016/0047338 A1 | 2/2016 | Ossareh et al. | |
| 2016/0160868 A1* | 6/2016 | Xiao | F02D 41/12 |
| | | | 415/118 |
| 2016/0169096 A1* | 6/2016 | Ossareh | F02M 35/10157 |
| | | | 123/559.1 |
| 2016/0312688 A1 | 10/2016 | Matsuo et al. | |

OTHER PUBLICATIONS

International Search Report and Written Opinion, PCT Appln. No. PCT/US2019/038682, 8 pgs., dated Sep. 13, 2019.

* cited by examiner

COMPRESSOR SURGE CONTROL

CROSS-REFERENCE TO RELATED APPLICATIONS

The present application is a continuation of International Patent Application No. PCT/US19/38682 filed on Jun. 24, 2019, which claims the benefit of the filing date of U.S. Provisional Application Ser. No. 62/693,109 filed on Jul. 2, 2018, each of which are incorporated herein by reference.

BACKGROUND

A compressor recirculation valve (CRV) is used to control the boost pressure from a compressor of a turbocharger system. Compressor surge is undesirable since it typically results in engine instability and surge oscillations which may damage the compressor, such as during transient load conditions. Therefore, further technological developments are desirable in this area.

SUMMARY

Unique systems, methods and apparatus are disclosed for providing or maintaining a target surge margin at the compressor during steady state engine operating conditions and to avoid compressor surge during transients by controlling a compressor recirculation valve position to a commanded position. In one embodiment, the estimated surge margin is determined in response to the measured pressure ratio across the compressor, an estimated compressor flow, and a compressor map for the compressor.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
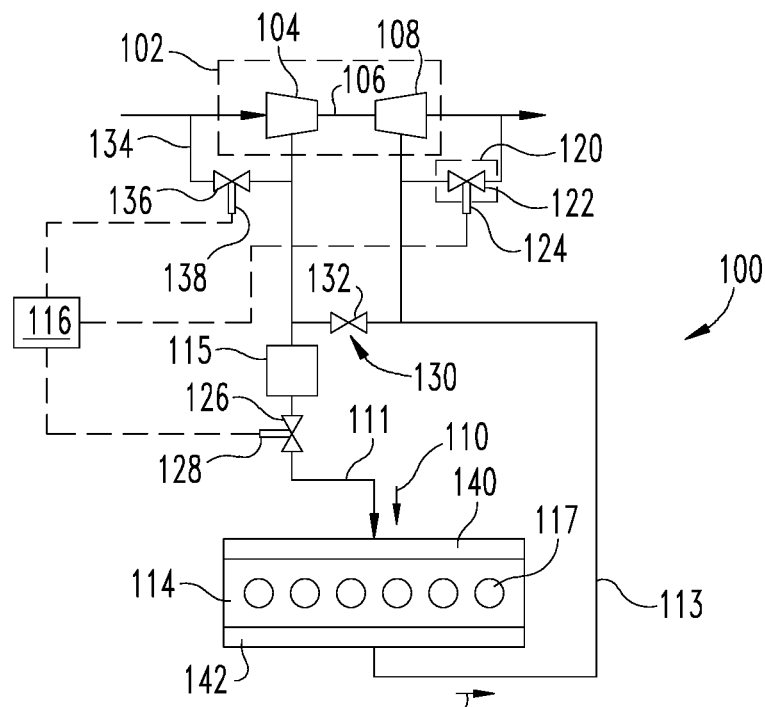
FIG. 1 is a schematic diagram of a system including an intake throttle, a compressor recirculation valve, and a turbocharger with a wastegate.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 for controlling a turbocharger 102 is schematically depicted. The system 100 includes an internal combustion engine 114 which may be an engine of any type, including at least a compression ignition engine, a spark ignition engine, a diesel engine, a gasoline engine, a natural gas engine, and combinations of these. The engine 114 emits exhaust gases 112 through an exhaust manifold 142, and exhaust gases 112 flow to the turbocharger 102 in an exhaust conduit 113, and transfer a portion of the kinetic and/or thermodynamic energy of the exhaust gases to the turbine 108 of the turbocharger 102. The transferred energy passes through a shaft 106 of the turbocharger 102 to a compressor 104 of the turbocharger 102. Compressor 104 provides compressed intake air 110 to engine 114 with an intake conduit 111.

The compressed intake air 110 is sometimes called charge air, charge gases, charge flow, intake air, or other terms, none of which are limiting. The compressed intake air 110 may pass through a charge cooler 115 before being received by the engine 114. The charge cooler 115 helps provide for increased air density for the intake air 110 to cylinders 117 of the engine 114, although the cooling reduces the pressure of the compressed intake flow 110. The charge cooler may be provided as shown, or arranged to provide after-cooling, two stage after-cooling, or any other charge cooler arrangement. The presence and operations of a charge cooler, if present, are well understood and not important to the operations of the turbocharger 102.

Intake conduit 111 further includes an intake throttle 126 that controls the charge flow to the intake manifold 140 of engine 114. Intake throttle 126 can include a throttle actuator 128 connected to a controller 116 that controls an opening and closing of intake throttle 126 to provide a desired intake flow amount to the intake of engine 114.

Certain features such as an exhaust throttle, an air filter, an intake air heater, and/or exhaust gas recirculation cooler, may be present or not in system 100. The presence and operations of such features are not depicted to enhance the clarity of the description.

The turbocharger 102 includes a wastegate 120 that allows exhaust gases 112 to bypass turbine 106. Wastegate 120 includes a WG valve 122 operably connected to a controllable WG actuator 124 that is operable to open and close WG valve 122 to control the size of the opening of wastegate 120 in response to one or more wastegate actuator position commands from controller 116.

The turbocharger 102 also includes a compressor recirculation flow path 134 that allows the intake flow to bypass or be recirculated around compressor 104. In the illustrated embodiment, compressor recirculation flow path 134 is connected upstream of charge cooler 115. In another embodiment, compressor recirculation flow path 134 is connected downstream of charge cooler 115. Other connection arrangements entry and exit of the compressor recirculation flow path are also contemplated. Compressor recirculation flow path 134 includes a compressor recirculation valve (CRV) 136 operably connected to a controllable CRV actuator 138 that is operable to open and close CRV 136 to control the size of the opening of compressor recirculation flow path 134 in response to one or more compressor recirculation valve actuator position commands from controller 116.

In one embodiment, system 100 includes an exhaust gas recirculation (EGR) flow path 130 which fluidly couples the engine exhaust side to the engine intake side. The EGR flowpath 130 may fluidly couple the exhaust manifold to the intake manifold, or any other portion of the exhaust system to any other portion of the intake system. The EGR flowpath 130 may include an EGR valve 132 in the example, although the EGR flowpath 130 may additionally or alternatively include an EGR cooler (not shown) and may further include EGR cooler bypass (not shown.) The EGR flowpath 130 may couple to the intake system at a position upstream or downstream of charge cooler 115, and upstream or downstream of intake throttle 126. The depicted EGR flowpath 130 in the system 100 is a "high pressure" EGR system, coupling the exhaust system upstream of the turbine 106 to the intake system downstream of the compressor 104. However, the EGR flowpath 130, where present, may be additionally or alternatively a low pressure EGR system coupling the exhaust system downstream of the turbine 106 to the intake system upstream of the compressor 104. The presence and type of EGR system and EGR components present is entirely optional and not limiting to the present disclosure.

The system 100 includes controller 116 structured to perform certain operations to control the wastegate valve 122 and compressor recirculation valve 136. In certain embodiments, the controller 116 forms a portion of a processing subsystem including one or more computing devices having memory, processing, and communication hardware. The controller may be a single device or a distributed device, and the functions of the controller may be performed by hardware and/or by a computer executing instructions stored in non-transient memory on one or more computer readable media.

In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or by a computer executing instructions stored in non-transient memory on one or more computer readable media, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any module or controller described herein that would be understood by one of skill in the art is contemplated herein. The modules and controllers herein, once the operations are described, are capable of numerous hardware and/or computer based implementations, many of the specific implementations of which involve mechanical steps for one of skill in the art having the benefit of the disclosures herein and the understanding of the operations of the modules and the controllers provided by the present disclosure. More specific descriptions of certain embodiments of controller operations are included in reference to FIG. 4.

Certain operations described herein include operations to interpret or determine one or more parameters. Interpreting or determining, as utilized herein, includes an operation to have the value made available by any method known in the art, including at least receiving the value from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any method known in the art (e.g. from an operator input), receiving a value by which the interpreted or determined parameter can be calculated, and/or by referencing a default value that is interpreted or determined to be the parameter value.

The schematic flow diagrams and related descriptions which follow provide illustrative embodiments of performing procedures for controlling a compressor recirculation valve position in response to a pressure ratio across the inlet and outlet of compressor 104, an estimated mass flow through the compressor 104, and a compressor map for the compressor 104 to maintain a desired surge margin during steady state conditions and avoid compressor surge during transients. Pressure oscillations at the compressor inlet may also be controlled via feedforward control of the position of the compressor recirculation valve 136 and/or wastegate 122. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product includes instructions causing the computer to execute one or more of the operations, or to issue commands to other devices to execute one or more of the operations.

Figure 2:
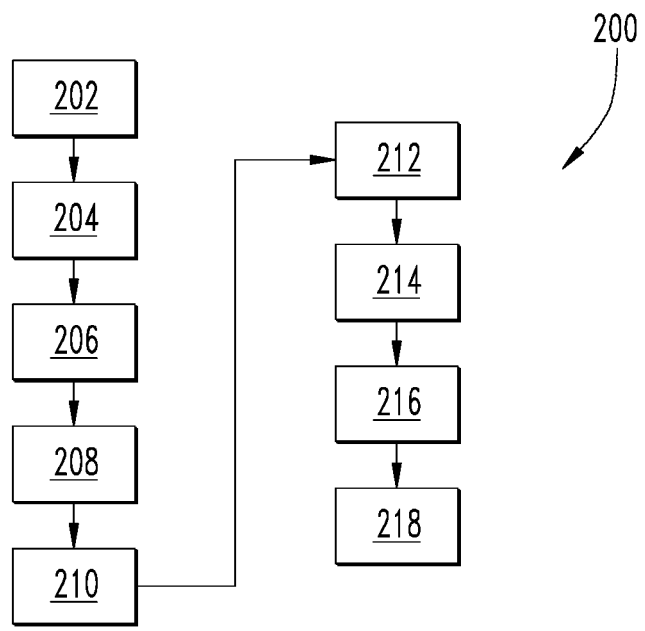
FIG. 2 is a flow diagram of a procedure for determining a CRV positon and wastegate position.

FIG. 2 is a flow diagram of one embodiment of a procedure 200 for controlling boost pressure, estimating surge margin, and avoiding compressor surge by adjusting commanded positions to a CRV 136 and wastegate valve 122 of a turbocharger, for improvement in speed stability and performance for engine 114, and to extend the compressor operating life. The control systems, procedures and apparatus disclosed herein improve system robustness in response to compressor surge resulting from, for example, load shedding and other transients, and to maintain a target surge margin during steady state conditions to improve engine robustness and performance.

In one embodiment, procedure 200 includes an operation 202 for determining a CRV position and wastegate valve position based on a COP correction and/or flow rate through CRV 136 or intake throttle 126 based on the target surge margin and a flow through the intake throttle 126; an operation 204 for estimating the surge margin at a current engine operating condition; an operation 206 for determining a target surge margin for the compressor; an operation 208 for determining an open loop CRV position to meet the target surge margin; an operation 210 for determining a first position of the CRV 136 based on the COP correction and the open loop CRV position; an operation 212 for determining a second position of the CRV 136 as a constraint to avoid compressor surge; an operation 214 for selecting between the first and second positions of the CRV 136 to avoid compressor surge; an operation 216 for determining a feedforward position of the CRV 136 and wastegate valve 122 in response a magnitude of the compressor surge; and an operation 218 determining a final position command to the CRV 136 and wastegate valve 122.

The procedure 200 includes determining a target surge margin at the compressor 104. Operation 202 may also include an operation to determine an intake throttle flow rate across the intake throttle 126. The surge margin is the distance from the surge line of the compressor map at the measured pressure ratio to the actual operating point of the compressor 104 on the compressor map, such as shown with respect to FIG. 3. The target surge margin is the desired distance or safety factor to be used to avoid compressor operation to the left of the surge line of FIG. 3. Determining the target surge margin includes calculating the measured pressure ratio from the measure compressor inlet pressure and the measured compressor outlet pressure. The compressor mass flow rate is also estimated from the charge flow and the flow across the CRV 136 using the orifice equation. Using the surge line estimation provided by the manufacture at the measured compressor ratio, such as shown with the compressor map in FIG. 3, the compressor mass flow rate at the surge line is estimated. The surge margin can be estimated using the following equation:

$$\text{surge margin estimate} = \frac{\text{estimated compressor mass flow rate} - \text{compressor mass flow rate at surge line}}{\text{compressor mass flow rate at surge line}} \quad \text{Equation 1}$$

Procedure 200 at operation 202 includes determining a compressor outlet pressure correction in response to the target surge margin, an intake throttle flow rate, and/or an actual surge margin at the compressor 104 in order to move or maintain the actual surge margin at the target surge margin. In one embodiment, this is an open loop control feature that opens the CRV 136 to move the operating point of the compressor 104 away from the surge line due to changing ambient conditions, combustion uncertainties, and other conditions. Compressor flow rate, together with surge margin, will be increased by opening the CRV 136. The position of the CRV 136 to obtain the desired surge margin is calculated as the difference between the actual compressor mass flow rate and the compressor mass flow rate at the desired or target compressor outlet pressure needed to meet the target surge margin. The target compressor outlet pressure is constant during steady state engine operating conditions and changes in response to a threshold change in the intake manifold pressure. In one embodiment, the open loop CRV position is filtered by a low pass filter to decouple the interaction between surge margin control and compressor outlet pressure control. One embodiment of a boost pressure or compressor outlet pressure control system and procedure is described in International Application No. PCT/US18/59324 filed Nov. 6, 2018, which is incorporated herein by reference in its entirety.

Procedure 200 also determines a first compressor recirculation valve position command for the first controllable actuator 138 of CRV 136 based on the closed loop compressor outlet pressure correction determined in response to operation 204. The first compressor recirculation valve position command can also include an open loop compressor recirculation valve position that is determined to maintain surge margin in a steady state. Procedure 200 further determines a second compressor recirculation valve command for the first controllable actuator 138 of CRV 136 based on a compressor flow rate required to avoid surge at a measured compressor outlet pressure and a measured compressor flow rate. The CRV position can be constrained to avoid compressor surge during steady state conditions and transients of the engine 114. The position of the CRV 136 to avoid surge is calculated as the difference between the actual compressor flow rate and the compressor flow rate needed at the existing compressor outlet pressure. The minimum CRV position can also avoid surge in conditions where the compressor outlet target is infeasible and during load transients.

Procedure 200 also positions the compressor recirculation valve 136 with the first controllable actuator 138 in response to one of the first and second compressor recirculation valve position commands. Procedure 200 may also include an operation to determine a compressor inlet pressure oscillation and/or magnitude change and position the wastegate valve 122 with the second controllable actuator 124 and/or the CRV 136 with first controllable actuator 138 in response to the compressor inlet pressure oscillation. This can be a feedforward command for the WG and/or CRV positions to provide pressure protection from the pressure oscillations that occur during compressor surge. For example, in the case of compressor degradation, the surge line and surge margin estimation may not be accurate, so the magnitude of the pressure oscillations at the compressor inlet during compressor surge can be used to apply a feedforward control output to position the CRV 136 and/or wastegate 122 to prevent damage from pressure oscillations that occur during surge conditions.

One embodiment procedure includes an operation to determine the CRV actuator position command by selecting the CRV actuator position command from a number of CRV actuator position command solution values. Example operations to select the CRV actuator position command from the number of CRV actuator position command solution values include selecting a CRV actuator position command that positions CRV 136 to provide a target flow through the compressor recirculation flow path 134 and/or through the compressor 104, and selecting a CRV actuator position command that position CRV 136 closest to a target flow through the compressor recirculation flow path 134 and/or compressor 104.

Another embodiment procedure includes an operation to determine the wastegate actuator position command by selecting the wastegate actuator position command from a number of wastegate actuator position command solution values. Example operations to select the wastegate actuator position command from the number of wastegate actuator position command solution values include selecting a wastegate actuator position command that positions wastegate 122 to provide a target exhaust flow through the wastegate 120 and/or turbine 108, and selecting a wastegate actuator position command that positions the wastegate 122 closest to a target exhaust flow through the wastegate 120 and/or turbine 108.

Figure 4:
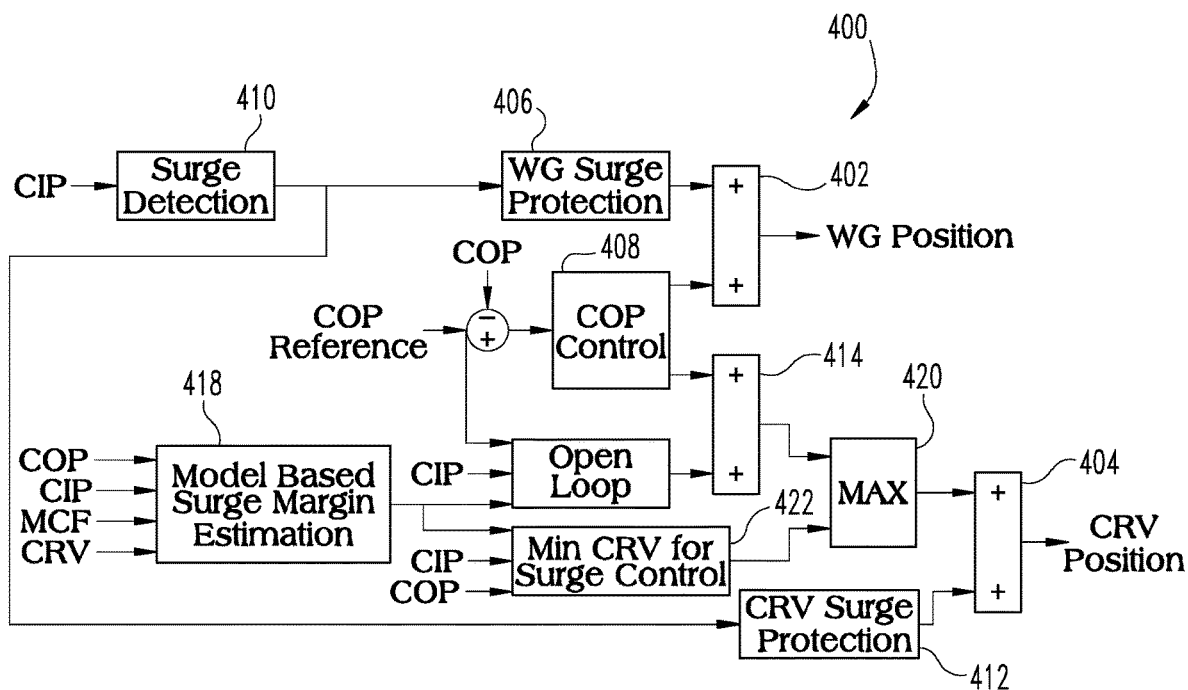
FIG. 4 is a schematic diagram of a processing subsystem for controlling boost pressure, estimating surge margin, and avoiding compressor surge by adjusting a commanded position to a compressor recirculation valve and the wastegate of the turbocharger.

FIG. 4 is a schematic illustration of a processing subsystem 400 including controller 116. The example processing subsystem 400 for controller 116 includes a wastegate position command module 402 and a CRV position command module 404. Other modules may also be present, and the described modules may be combined, or further separated into additional modules, and are not limited to the described modules. Wastegate position command module 402 determines a wastegate position command in response to a first wastegate position output from a wastegate surge protection control block 406 and a second wastegate position output from a compressor outlet pressure (COP) control block 408. Wastegate surge protection control block 406 receives an output from a surge detection block 410 that detects a compressor surge condition from pressure oscillations at the compressor inlet in response to one or more compressor inlet pressure (CIP) inputs. The output from the surge detection block 410 is also provided to a CRV surge protection control block 412. CRV surge protection control block 412 provides a CRV position output for surge protection to CRV position command module 404.

The COP control block 408 receives an error determination between an actual COP and a target COP and determines the second wastegate position output in response to the error determination and the second wastegate position output is provided to wastegate position command module 402. The COP control block 408 also determines a CRV position by closed loop COP compensation in response to the error determination from the target and measured COP, and the CRV position determined by closed loop COP compensation is provided to a summation block 414. Summation block 414 also receives an open loop CRV position from an open loop CRV position control block 416.

Figure 3:
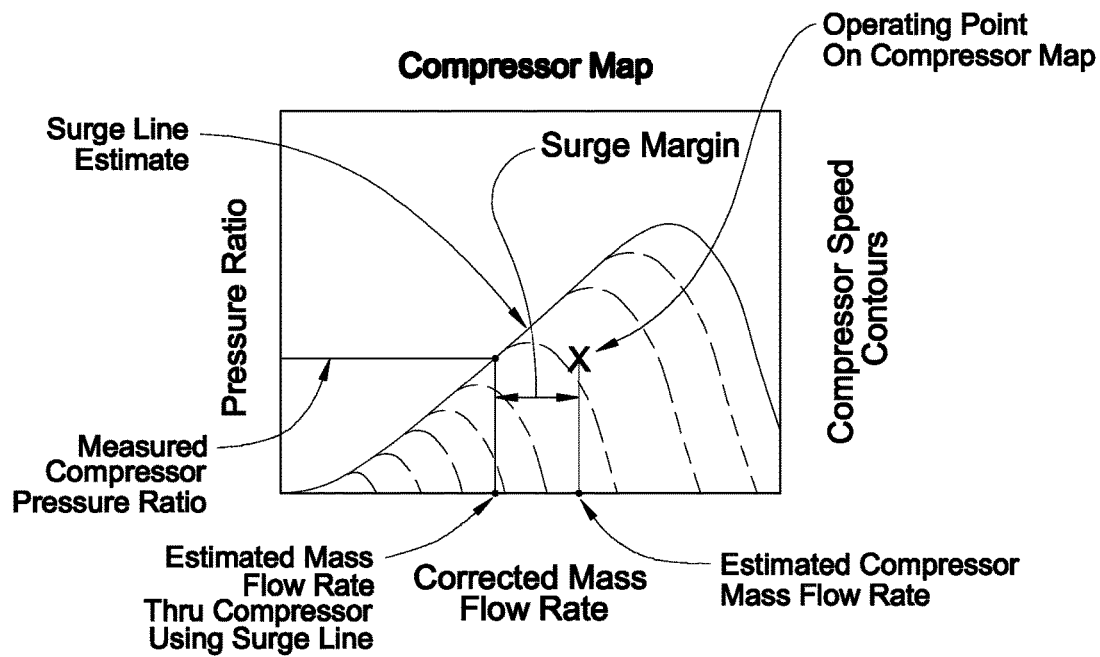
FIG. 3 is an example compressor map showing surge margin estimation using the measured compressor pressure ratio, estimated compressor flow rate, and surge line on the compressor map.

CRV position control block 416 receives inputs of the COP reference, a compressor inlet pressure (CIP), and the surge margin estimate from surge margin estimation block 418. As discussed above, the surge margin estimate is determined in response to the compressor pressure ratio based on the measured COP and CIP, the measured mass flow rate through the compressor 104, and the compressor map (FIG. 3.) The open loop CRV position from CRV position control block 416 is provided to summation block 414. The open loop CRV position that is based on the open loop control and the CRV position determined by closed loop COP compensation from the COP control block 408 are summed and output to the maximum CRV position selection block 420.

The maximum CRV selection block 420 also receives a minimum CRV position determination (minimum opening size through the compressor bypass 134) for surge control from surge control block 422. As discussed above with respect to procedure 200, surge control block 422 determines a minimum CRV position based on the output from surge margin estimation block 418, the measured CIP, and the measured COP. The minimum CRV position for surge control is provided to maximum CRV selection block 420, and the maximum CRV position is selected by selector block 420 and provided to CRV position command module 404. The CRV position command module 404 provides a CRV position command(s) based on the outputs received from maximum CRV selection block 420 and the CRV surge protection control block 412 to provide the final command for the CRV position.

As is evident from the figures and text presented above, a variety of aspects and embodiments according to the present disclosure are contemplated. In one aspect, a method or procedure includes determining a target surge margin at a compressor of a turbocharger of an internal combustion engine. The internal combustion engine includes a compressor recirculation valve including a first controllable actuator for controlling a position of the compressor recirculation valve, and the turbocharger includes a turbine with a turbine bypass and a wastegate including a second controllable actuator for controlling a position of the wastegate in the turbine bypass. The method further includes determining a compressor recirculation flow rate correction in response to the target surge margin and a throttle flow rate; determining a first compressor recirculation valve position command for the first controllable actuator based on a closed loop compressor outlet pressure compensation and an open loop compressor recirculation valve position determined to maintain the target surge margin in a steady state; determining a second compressor recirculation valve command for the first controllable actuator based on a compressor flow rate required to avoid surge at a measured compressor outlet pressure and a measured compressor flow rate; and positioning the compressor recirculation valve with the first controllable actuator in response to one of the first and second compressor recirculation valve position commands.

In one embodiment, the method includes determining a compressor inlet pressure oscillation and positioning the wastegate with the second controllable actuator in response to the compressor inlet pressure oscillation. In a refinement of this embodiment, the method includes determining a feedforward position for the compressor recirculation valve in response to the compressor inlet pressure oscillation.

In another embodiment, the internal combustion engine includes a charge cooler upstream of an intake throttle and downstream of the compressor of the turbocharger. In yet another embodiment, the compressor recirculation valve position is determined in response to the one of the first and second compressor recirculation valve position commands that provides a greater flow through the compressor recirculation valve to avoid compressor surge during load transients. In still another embodiment, the compressor outlet pressure correction further includes determining a difference between an actual compressor outlet pressure and a target compressor outlet pressure.

In a further embodiment, the target surge margin is determined in response to a difference between an operating condition of the engine. In one refinement, the target compressor outlet pressure is constant during steady state engine operating conditions. In another refinement, the target compressor outlet pressure changes in response to a threshold change in the intake manifold pressure.

In another aspect, an apparatus includes an electronic controller configured to determine a compressor recirculation valve position command that controls a compressor recirculation valve actuator to position a compressor recirculation valve in a compressor recirculation flow path of an internal combustion engine. The electronic controller is configured to determine a wastegate actuator position command that controls a wastegate actuator to position a wastegate in a turbine bypass of the internal combustion engine. The position of the compressor recirculation valve is determined by the controller in response to a target surge margin at the compressor and a compressor outlet pressure correction, and a compressor flow rate required to avoid surge at a measured compressor outlet pressure.

In one embodiment, the controller is configured to position the compressor recirculation valve based on the compressor recirculation valve position that provides the maximum flow through the compressor at a given boost pressure while maintaining surge margin. In another embodiment, the controller is configured to determine a feedforward compressor recirculation valve positon and wastegate position in response to pressure oscillations at an inlet to the compressor.

In yet another embodiment, the controller is configured to determine the target surge margin in response to an operating condition of the engine. In a refinement of this embodiment, the target compressor outlet pressure is constant during steady state engine operating conditions. In another refinement, the target compressor outlet pressure changes in response to a threshold change in the intake manifold pressure.

According to another aspect, a system includes an internal combustion engine pneumatically coupled to a compressor of a turbocharger on an inlet side of the engine and to a turbine of the turbocharger on an outlet side of the engine. The compressor includes a compressor recirculation flow path and a compressor recirculation valve in the compressor recirculation flow path connected to a compressor recirculation valve actuator responsive to a compressor recirculation valve actuator command. The turbine includes a wastegate connected to a wastegate actuator responsive to a wastegate actuator position command. The system also includes a controller configured to determine a position of the compressor recirculation valve based on a target surge margin at the compressor and a compressor outlet pressure correction and a compressor flow rate required to avoid surge at a measured compressor outlet pressure. The compressor recirculation valve is moved to the position in response to a command from the controller.

In one embodiment, the system includes a charge cooler between the intake throttle and the compressor of the turbocharger, and an exhaust gas recirculation system connecting the inlet and outlet sides of the engine. In another embodiment, the controller is configured to position the compressor recirculation valve based on the position of the compressor recirculation valve that provides the maximum flow through the compressor at a given boost pressure while maintaining surge margin.

In another embodiment, the controller is configured to determine a feedforward compressor recirculation valve positon and wastegate position in response to pressure oscillations at an inlet to the compressor. In yet another embodiment, the controller is configured to determine the target surge margin in response to an engine operating condition.

While the invention has been illustrated and described in detail in the drawings and foregoing description, the same is to be considered as illustrative and not restrictive in character, it being understood that only certain example embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining a target surge margin at a compressor of a turbocharger of an internal combustion engine, the internal combustion engine including a compressor recirculation valve including a first controllable actuator for controlling a position of the compressor recirculation valve, the turbocharger further including a turbine with a turbine bypass and a wastegate including a second controllable actuator for controlling a position of the wastegate in the turbine bypass;
   determining a compressor recirculation flow rate correction in response to the target surge margin and a throttle flow rate;
   determining a first compressor recirculation valve position command for the first controllable actuator based on a closed loop compressor outlet pressure compensation and an open loop compressor recirculation valve position determined to maintain the target surge margin in a steady state;
   determining a second compressor recirculation valve command for the first controllable actuator based on a compressor flow rate required to avoid surge at a measured compressor outlet pressure and a measured compressor flow rate;
   selecting one of the first and second compressor recirculation valve position commands; and
   positioning the compressor recirculation valve with the first controllable actuator in response to the selected one of the first and second compressor recirculation valve position commands.

2. The method of claim 1, further comprising determining a compressor inlet pressure oscillation and positioning the wastegate with the second controllable actuator in response to the compressor inlet pressure oscillation.

3. The method of claim 2, further comprising determining a feedforward position for the compressor recirculation valve in response to the compressor inlet pressure oscillation.

4. The method of claim 1, wherein the internal combustion engine includes a charge cooler upstream of an intake throttle and downstream of the compressor of the turbocharger.

5. The method of claim 1, wherein the selected compressor recirculation valve position command is determined in response to the one of the first and second compressor recirculation valve position commands that provides a greater flow through the compressor recirculation valve to avoid compressor surge during load transients.

6. The method of claim 1, wherein the target surge margin is determined in response to a difference between an operating condition of the engine.

7. The method of claim 6, wherein the target compressor outlet pressure is constant during steady state engine operating conditions.

8. The method of claim 6, wherein the target compressor outlet pressure changes in response to a threshold change in the intake manifold pressure.

9. The method of claim 1, wherein the compressor outlet pressure correction further includes determining a difference between an actual compressor outlet pressure and a target compressor outlet pressure.

10. An apparatus, comprising:
    an electronic controller configured to detect a compressor surge condition and, in response to the compressor surge condition:
    determine a first compressor recirculation valve position based on a closed loop compressor outlet pressure compensation and an open loop compressor recirculation valve position that maintains the target surge margin in a steady state;
    determine a second compressor recirculation valve position based on a compressor flow rate required to avoid surge at a measured compressor outlet pressure and a measured compressor flow rate;

determine, in response to a selected one of the first and second compressor recirculation valve positions, a compressor recirculation valve position command that controls a compressor recirculation valve actuator to position a compressor recirculation valve in a compressor recirculation flow path of an internal combustion engine, the electronic controller further being configured to determine a wastegate actuator position command that controls a wastegate actuator to position a wastegate in a turbine bypass of the internal combustion engine.

11. The apparatus of claim 10, wherein the controller is configured to:
select the one of the first and second compressor recirculation valve positions for the position of the compressor recirculation valve based on the compressor recirculation valve position that provides the maximum flow through the compressor at a given boost pressure while maintaining surge margin; and
move the compressor recirculation valve to the selected one of the first and second compressor recirculation valve positions.

12. The apparatus of claim 10, wherein the controller is further configured to determine a feedforward compressor recirculation valve position and wastegate position in response to pressure oscillations at an inlet to the compressor.

13. The apparatus of claim 10, wherein the controller is configured to determine the target surge margin in response to an operating condition of the engine.

14. The apparatus of claim 13, wherein the target compressor outlet pressure is constant during steady state engine operating conditions.

15. The apparatus of claim 13, wherein the target compressor outlet pressure changes in response to a threshold change in the intake manifold pressure.

16. A system, comprising:
an internal combustion engine pneumatically coupled to a compressor of a turbocharger on an inlet side of the engine and to a turbine of the turbocharger on an outlet side of the engine, the compressor including a compressor recirculation flow path and a compressor recirculation valve in the compressor recirculation flow path connected to a compressor recirculation valve actuator responsive to a compressor recirculation valve actuator command, the turbine comprising a wastegate connected to a wastegate actuator responsive to a wastegate actuator position command; and
a controller configured to detect a compressor surge condition and, in response to the compressor surge condition:
determine a first compressor recirculation valve position based on a closed loop compressor outlet pressure compensation and an open loop compressor recirculation valve position that maintains the target surge margin in a steady state, determine a second compressor recirculation valve position based on a compressor flow rate required to avoid surge at a measured compressor outlet pressure and a measured compressor flow rate; and
select one of the first compressor recirculation valve position and the second compressor recirculation valve position,
wherein the compressor recirculation valve is moved to the selected position in response to a command from the controller.

17. The system of claim 16, further comprising:
a charge cooler between an intake throttle and the compressor of the turbocharger; and
an exhaust gas recirculation system connecting the inlet and outlet sides of the engine.

18. The system of claim 16, wherein the controller is configured to:
select the one of the first and second compressor recirculation valve positions for the position the compressor recirculation valve based on the position of the compressor recirculation valve that provides the maximum flow through the compressor at a given boost pressure while maintaining surge margin.

19. The system of claim 16, wherein the controller is further configured to determine a feedforward compressor recirculation valve position and wastegate position in response to pressure oscillations at an inlet to the compressor.

20. The system of claim 16, wherein the controller is configured to determine the target surge margin in response to an engine operating condition.

* * * * *